(12) United States Patent
Bergström et al.

(10) Patent No.: US 11,904,402 B2
(45) Date of Patent: Feb. 20, 2024

(54) SPOT WELDING MACHINE

(71) Applicant: Car-O-Liner Group AB, Västra Frölunda (SE)

(72) Inventors: Anders Bergström, Västra Frölunda (SE); Tony Hedlund, Arboga (SE)

(73) Assignee: Car-O-Liner Group AB, Västra Frölunda (SE)

(*) Notice: Subject to any disclaimer, the term of this patent is extended or adjusted under 35 U.S.C. 154(b) by 635 days.

(21) Appl. No.: 17/058,990

(22) PCT Filed: Jun. 10, 2019

(86) PCT No.: PCT/SE2019/050539
§ 371 (c)(1),
(2) Date: Nov. 30, 2020

(87) PCT Pub. No.: WO2020/009635
PCT Pub. Date: Jan. 9, 2020

(65) Prior Publication Data
US 2021/0252628 A1    Aug. 19, 2021

(30) Foreign Application Priority Data

Jul. 4, 2018 (SE) .................................. 1850844-0

(51) Int. Cl.
*B23K 11/24* (2006.01)
*B23K 11/11* (2006.01)
(Continued)

(52) U.S. Cl.
CPC ............. *B23K 11/24* (2013.01); *B23K 11/115* (2013.01); *B23K 11/256* (2013.01);
(Continued)

(58) Field of Classification Search
CPC ..... B23K 11/115; B23K 11/24; B23K 11/256; B23K 11/257; B23K 11/258; B23K 11/28; B23K 11/241; B23K 11/253; B23K 11/34
See application file for complete search history.

(56) References Cited

U.S. PATENT DOCUMENTS

| 3,654,424 A | 4/1972 | Vanderhelst |
| 4,329,561 A | 5/1982 | Schafer et al. |
(Continued)

FOREIGN PATENT DOCUMENTS

| DE | 10334478 A1 | 3/2005 |
| EP | 2954970 A1 | 12/2015 |
| KR | 20170097514 A | 8/2017 |

OTHER PUBLICATIONS

International Search Report and Written Opinion for International Application No. PCT/SE2019/050539 dated Sep. 2, 2019, 14 pages.

*Primary Examiner* — Dana Ross
*Assistant Examiner* — Joe E Mills, Jr.
(74) *Attorney, Agent, or Firm* — RMCK Law Group, PLC

(57) ABSTRACT

The present disclosure generally relates to a welding machine adapted for performing a spot welding process on a workpiece, wherein the welding machine is specifically adapted for automatically applying pre-conditioning a welding pulse portion to the workpiece prior to performing the spot welding process. The present disclosure also relates to a corresponding method and computer program product.

14 Claims, 4 Drawing Sheets

(51) Int. Cl.
*B23K 11/25* (2006.01)
*B23K 11/28* (2006.01)

(52) U.S. Cl.
CPC .......... *B23K 11/257* (2013.01); *B23K 11/258* (2013.01); *B23K 11/28* (2013.01)

(56) References Cited

U.S. PATENT DOCUMENTS

| | | |
|---|---|---|
| 4,447,700 A | 5/1984 | Cohen |
| 4,456,810 A | 6/1984 | Schumacher et al. |
| 8,357,870 B1 | 1/2013 | Edwards |
| 2013/0020288 A1* | 1/2013 | Moision ................ B23K 11/25 219/108 |
| 2013/0048613 A1 | 2/2013 | Sigler et al. |

* cited by examiner

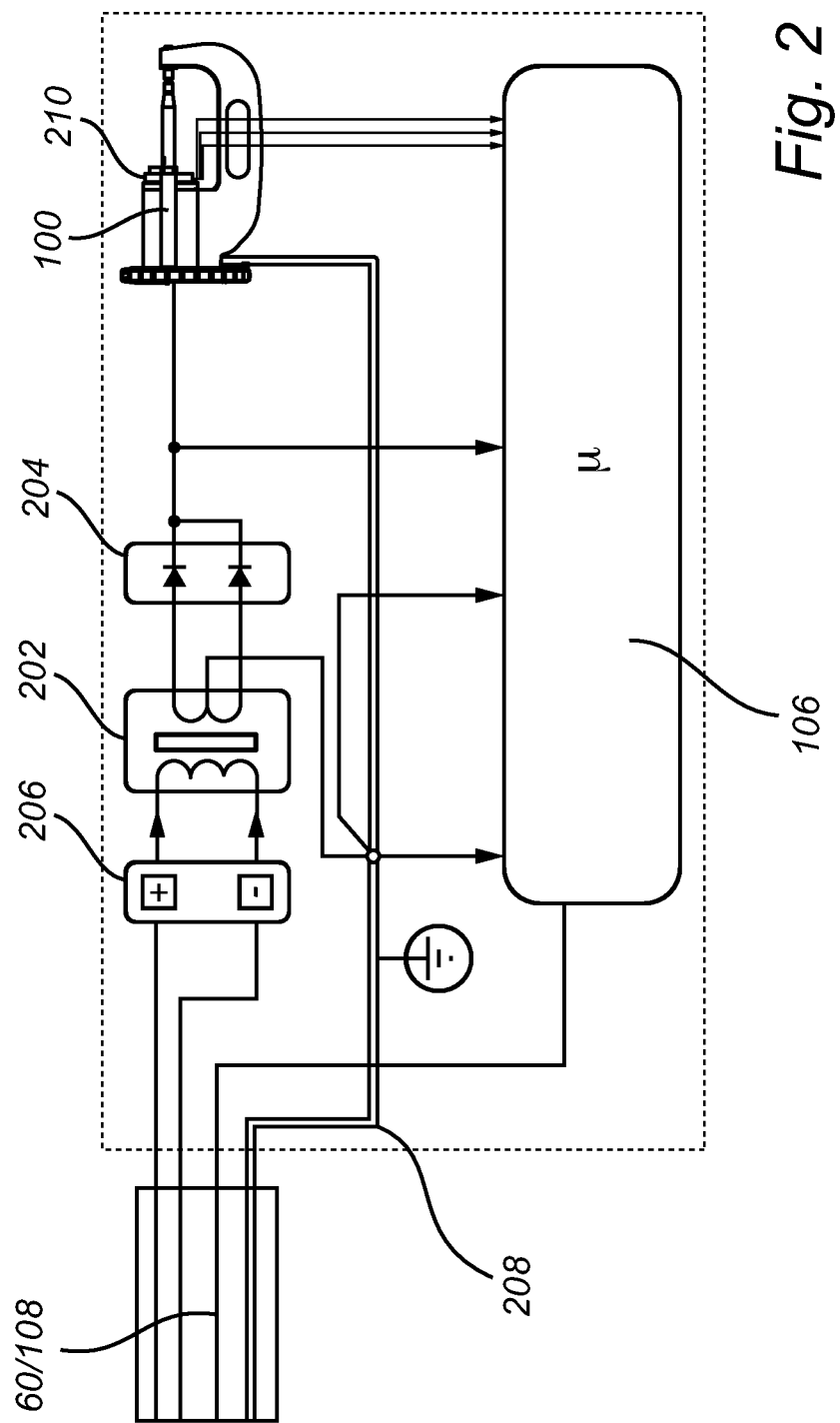

SPOT WELDING MACHINE

CROSS-REFERENCE TO RELATED APPLICATIONS

This application is a 371 U.S. National Stage of International Application No. PCT/SE2019/050539, filed Jun. 10, 2019, which claims priority to Swedish Patent Application No. 1850844-0 filed Jul. 4, 2018. The disclosures of each of the above applications are incorporated herein by reference in their entirety.

TECHNICAL FIELD

The present disclosure generally relates to a welding machine adapted for performing a spot welding process on a workpiece, wherein the welding machine is specifically adapted for automatically applying pre-conditioning a welding pulse portion to the workpiece prior to performing the spot welding process. The present disclosure also relates to a corresponding method and computer program product.

BACKGROUND

In the field of welding, spot welding machines, are commonly used. The spot welding machine may comprise a power unit and a portable welding gun, where the welding gun in turn comprises a handle for holding the welding gun during operation thereof. Moreover, the spot welding gun preferably comprises a housing containing various electronical and mechanical components, adapted to receive e.g. electrical power from the power unit.

A movable welding electrode is comprised with the welding gun, where the welding electrode is movable in relation to the housing. The welding electrode comprises a tip portion, also known as a welding cap, at an outer end thereof. The spot welding gun further comprises a stationary welding electrode also comprising a tip portion.

During a welding operation, a material to be welded, below referred to as a workpiece, is positioned between the tip portions of the movable and stationary welding electrodes, whereby the tip portions move towards each other such as to expose the material to a pressure, where after electric welding current is supplied through the material via the welding electrodes.

One of the major issues relating to spot welding is a possible presence of e.g. a non-conducting oxide film on the workpiece, resulting in an undesirably high resistance between the workpiece and the electrodes. This oxide film can cause excessive overheating at both the welding electrodes and the workpiece. Typical solutions to the problem of electrode/workpiece overheating include the use of welding electrodes designed with in comparison large, flat weld faces that reduce the current density and, thus, heating at these locations. However, the use of such large, flat electrodes produces undesired consequences for manufacturing.

An example of trying to overcome the problem with the above-mentioned oxide film and resulting undesirable resistance is presented in US20130048613. Specifically, US20130048613 suggests applying a welding current at different levels during three specific steps of each spot weld cycle with cooling times between each step. In the first step, the welding current is brought up gradually over a few milliseconds to a level for decreasing the electrical resistance to a consistent low value at both the electrode/sheet interfaces and the underlying faying surfaces.

Even though US20130048613 present an interesting approach to removing the above-mentioned oxide film and reducing the resulting undesirable resistance between the between the workpiece and the electrodes, the solution presented in US20130048613 is static and thus not useful in applications where e.g. different types of workpieces and electrode assemblies are continuously used. Thus, there appears to be room for further improvements, allowing for further flexibility in regards to spot welding.

SUMMARY

It is therefore an object of the present disclosure to provide a spot welding machine which at least partially overcomes the above deficiencies. This is achieved, according an aspect of the present disclosure, by a welding machine adapted for performing a spot welding process on a workpiece, wherein the welding machine comprises a welding gun including a pair of opposed electrodes for receiving the workpiece, a transformer having a primary input side and secondary output side, the secondary output side connected to the pair of electrodes, and a control unit adapted to control the spot welding process, wherein the control unit is further adapted to control the transformer for applying, prior to performing the spot welding process, a first welding pulse portion to the workpiece using the welding gun, receive, from measurement means arranged at the secondary output side of the transformer, an indication of a first voltage and a first current applied in relation to the first welding pulse portion, determine a first resistance value based on the indication of the first voltage and the first current, compare the first resistance value with a predetermined resistance threshold, control the transformer for applying, prior to performing the spot welding process, a further second welding pulse portion to the workpiece using the welding gun if the first resistance value is above the predetermined resistance threshold, and initiate the spot welding process if the first resistance value is below the predetermined resistance threshold.

The principal idea behind the present disclosure resides in an automated (and if needed) iterative pre-conditioning of the workpiece before initiating the "actual" spot welding process (where the welding current is applied to the workpiece). That is, in line with the present disclosure the application the first/second welding pulse portion is solely for performing the pre-conditioning of the workpiece, i.e. not for welding e.g. two sheet metals of the workpiece together. In comparison to prior art, the present disclosure allows for an automated adaptation of for how long the pre-conditioning should be, by e.g. performing continuous measurements of the voltage and current applied during the first (and possibly the second) welding pulse portion.

The proposed solution allows for an adaptive scheme to be applied, thus not needing to reside in the use of fixed setting e.g. in regards to voltage, current and duration for performing the pre-conditioning of the workpiece. Rather, all of the voltage, current and duration (e.g. X Ampere (A) at Y Volt (V) for Z Time (s)) of performing the pre-conditioning of the workpiece may be allowed to vary dependent on e.g. an individual condition of the workpiece. For achieving such controllability, the welding machine according to the preset disclosure is adapted to allow for the voltage and current to be "sampled" at the secondary side of transformed comprised with the welding machine. That is, the measurements are essentially done "where" the pre-conditioning of the workpiece is performed. Accordingly, an in comparison fast feedback scheme may be implemented where e.g. the duration, voltage, current may be adapted for the preconditioning with the purpose of reducing the resistance at the workpiece to a desirable level, i.e. at or below the predetermined resistance threshold (as defined above).

Advantageously, since the proposed pre-conditioning scheme then continues with the actual spot welding process, it is possible to ensure that the pre-conditioning of the workpiece in fact is performed by the operator/user of the welding machine, and also until the resistance is below the predetermined resistance threshold. That is, in applications where the operator/user manually has to select if and possibly for how long the pre-conditioning of the workpiece is to be performed, it may be possible that the operator/user either forgets or performs the pre-conditioning of the workpiece for a too short (or long) duration, whereby the actual spot welding process possibly may be performed with an undesirable result (e.g. resulting in a low quality weld).

Generally, the first welding pulse portion has a setting and the second welding pulse portion has a setting. As indicated above, the setting for the first/second welding pulse portion may for example include setting a duration, voltage, current for the first/second welding pulse portion. Possibly, the duration may for example be between 1 ms and 1000 ms (or even more) and the current may be between 1% and 60% (or even more) of the "normal" spot welding current. The setting for the first/second welding pulse portion may also be based on e.g. a thickness of the (e.g. overall) workpiece. The thickness of the workpiece may for example be determined by pressing the electrodes of the welding gun together or possibly by allowing the user to input corresponding details using e.g. a user interface of the welding machine. Correspondingly, the predetermined resistance threshold may be based on similar information, e.g. based on a determined or inputted thickness of the workpiece (or material of the workpiece).

In accordance to the present disclosure, the expression "welding pulse portion" should be interpreted broadly. That is, in a possible embodiment the first welding pulse portion and the second welding pulse portion may be applied consecutively without e.g. the current level for the welding pulse portion to "go back to zero" (i.e. without the prior-art suggested "pause"). Rather, the intermediate voltage and current measurements may result in a resistance value being higher than the threshold, whereby essentially just the duration of the pre-conditioning is increased when applying also the second welding pulse portion. However, in another embodiment there may possibly be applied an in comparison short pause between the application of the first and the second welding pulse portion. In a possible embodiment, the first and possibly the second (and possibly further) welding pulse portion(s) are provided prior to but successively with the (actual) spot welding pulse applied to the workpiece for spot welding of the workpiece, without applying a pause in between.

In line with the present disclosure, the measurement means may comprise a current sensor and a voltage sensor. An exemplary implementation of the measurement means in relation to the welding machine is provided below in relation to the detailed description of the present disclosure. Other implementations are possible and within the scope of the present disclosure.

In a possible embodiment of the present disclosure, the control unit is further adapted to, if the second welding pulse portion has been applied to the workpiece using the welding gun, receive, from the measurement means arranged at the secondary output side of the transformer, an indication of a second voltage and a second current applied in relation to the first welding pulse portion, determine a second resistance value based on the indication of the second voltage and the second current, compare the second resistance value with the predetermined resistance threshold, and control the transformer for applying, prior to performing the spot welding process, a further third welding pulse portion to the welding gun if the second resistance value is above the predetermined resistance threshold. Consequently, the duration of the pre-conditioning may be further increased to ensure that the resistance is lowered below the thereto related threshold.

Accordingly, the pre-conditioning may as indicated above be performed as an iterative process by an application of the first, second and third welding pulse portion to the welding gun. Advantageously, the setting for the first welding pulse portion may possibly be different from the setting for the second welding pulse portion, thereby allowing for e.g. an increasing current (e.g. an increase with e.g. 10%-20% of the current) when applying the second welding pulse portion as compared to when applying the first welding pulse portion.

Correspondingly, the setting for second welding pulse portion may be set different from a setting for the third welding pulse portion. Also, the first and the second setting may be the same and only e.g. an increase of the current is used when applying the third welding pulse portion. Accordingly, in one embodiment of the present disclosure a current value for at least one of the first and second welding pulse portion may be set lower as compared to a corresponding current value applied during the spot welding process. Similarly, in another embodiment, e.g. a duration of at least one of the first and second welding pulse portion may be set shorter as compared to corresponding duration applied during the spot welding process.

In a possible embodiment the welding gun comprises a housing, and the transformer and the control unit are arranged within the housing of the welding gun. In another possible embodiment the welding machine is movable, e.g. comprising means allowing the welding machine to be moved within e.g. a workshop. That is, the welding gun may be portable while the power unit as discussed above may be movable, thus making the welding machine movable.

According to another aspect of the present disclosure, there is provided a method of controlling a resistance at a workpiece prior to performing a spot welding process to a workpiece using a welding machine, the welding machine comprising a welding gun including a pair of opposed electrodes for receiving the workpiece, a transformer having a primary input side and secondary output side, the secondary output side connected to the pair of electrodes; and a control unit adapted to control the spot welding process, wherein the method comprises the steps of controlling, using the control unit, the transformer for applying, prior to performing the spot welding process, a first welding pulse portion to the workpiece using the welding gun, receiving, at the control unit from measurement means arranged at the secondary output side of the transformer, an indication of a first voltage and a first current applied in relation to the first welding pulse portion, determining, at the control unit, a first resistance value based on the indication of the first voltage and the first current, comparing, at the control unit, the first resistance value with a predetermined resistance threshold, controlling, using the control unit, the transformer for applying, prior to performing the spot welding process, a further second welding pulse portion to the workpiece using the welding gun if the first resistance value is above the predetermined resistance threshold, and initiating, using the control unit, the spot welding process if the first resistance value is below the predetermined resistance threshold. This aspect of the present disclosure provides similar advantages as discussed above in relation to the previous aspect of the present disclosure.

According to still further aspect of the present disclosure, there is provided a computer program product comprising a non-transitory computer readable medium having stored thereon computer program means for controlling a welding machine adapted for performing a spot welding process on a workpiece, wherein the welding machine comprises a welding gun including a pair of opposed electrodes for receiving the workpiece, a transformer having a primary input side and secondary output side, the secondary output side connected to the pair of electrodes, and a control unit adapted to control the spot welding process, wherein the computer program product comprises code for controlling, using the control unit, the transformer for applying, prior to performing the spot welding process, a first welding pulse portion to the workpiece using the welding gun, code for receiving, at the control unit from measurement means arranged at the secondary output side of the transformer, an indication of a first voltage and a first current applied in relation to the first welding pulse portion, code for determining, at the control unit, a first resistance value based on the indication of the first voltage and the first current, code for comparing, at the control unit, the first resistance value with a predetermined resistance threshold, code for controlling, using the control unit, the transformer for applying, prior to performing the spot welding process, a further second welding pulse portion to the workpiece using the welding gun if the first resistance value is above the predetermined resistance threshold, and code for initiating, using the control unit, the spot welding process if the first resistance value is below the predetermined resistance threshold. Also this aspect of the present disclosure provides similar advantages as discussed above in relation to the previous aspects of the present disclosure.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which:

FIG. 2 shows an exemplary electrical architecture for performing the pre-conditioning scheme according to the present disclosure using the spot welding machine as shown in FIG. 1.

DETAILED DESCRIPTION

Figure 1A:
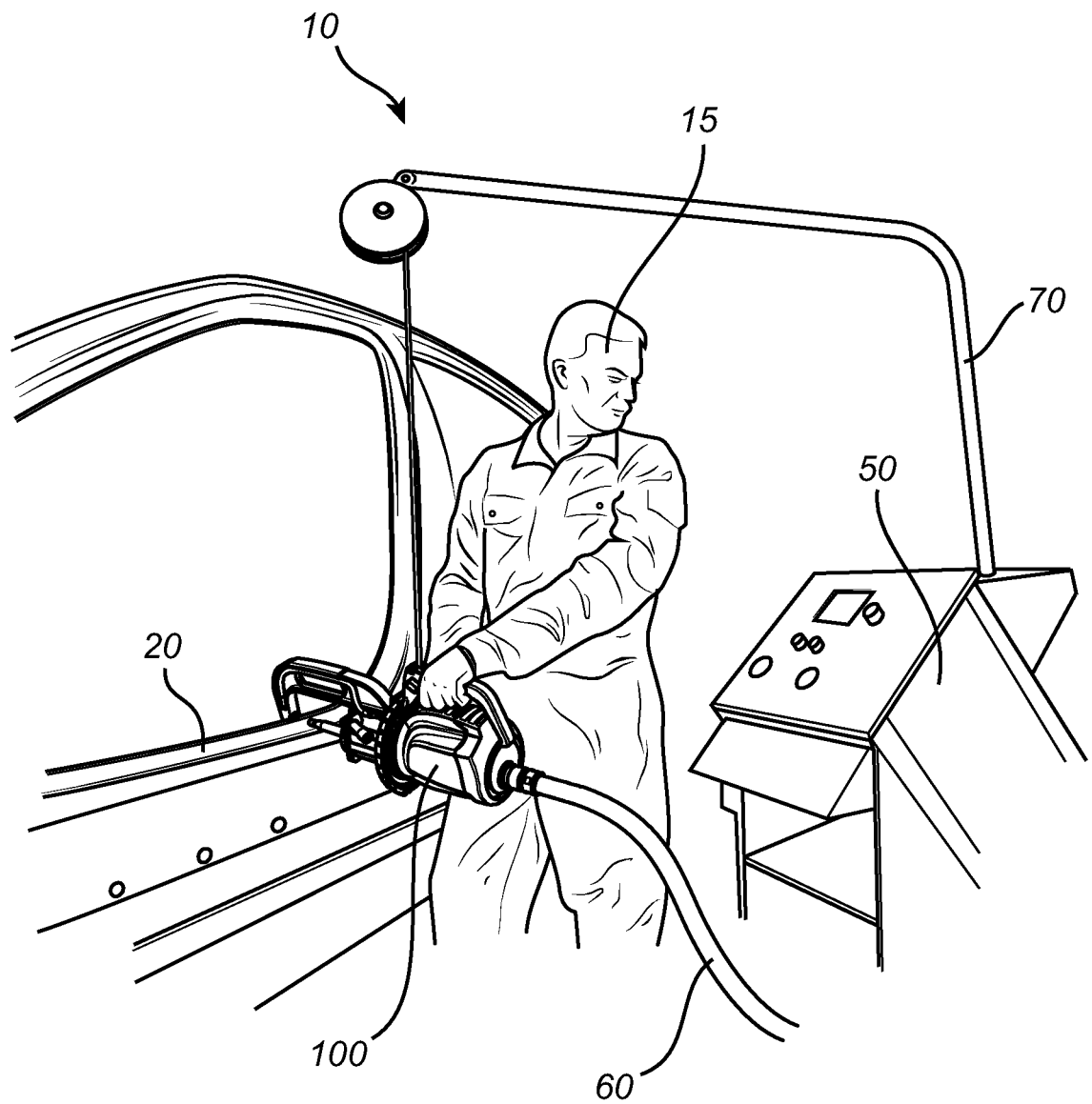
FIG. 1A is a conceptual illustration of a spot welding machine according to the present disclosure, comprising a welding gun schematically exemplified in FIG. 1B.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like features throughout.

Figure 1B:
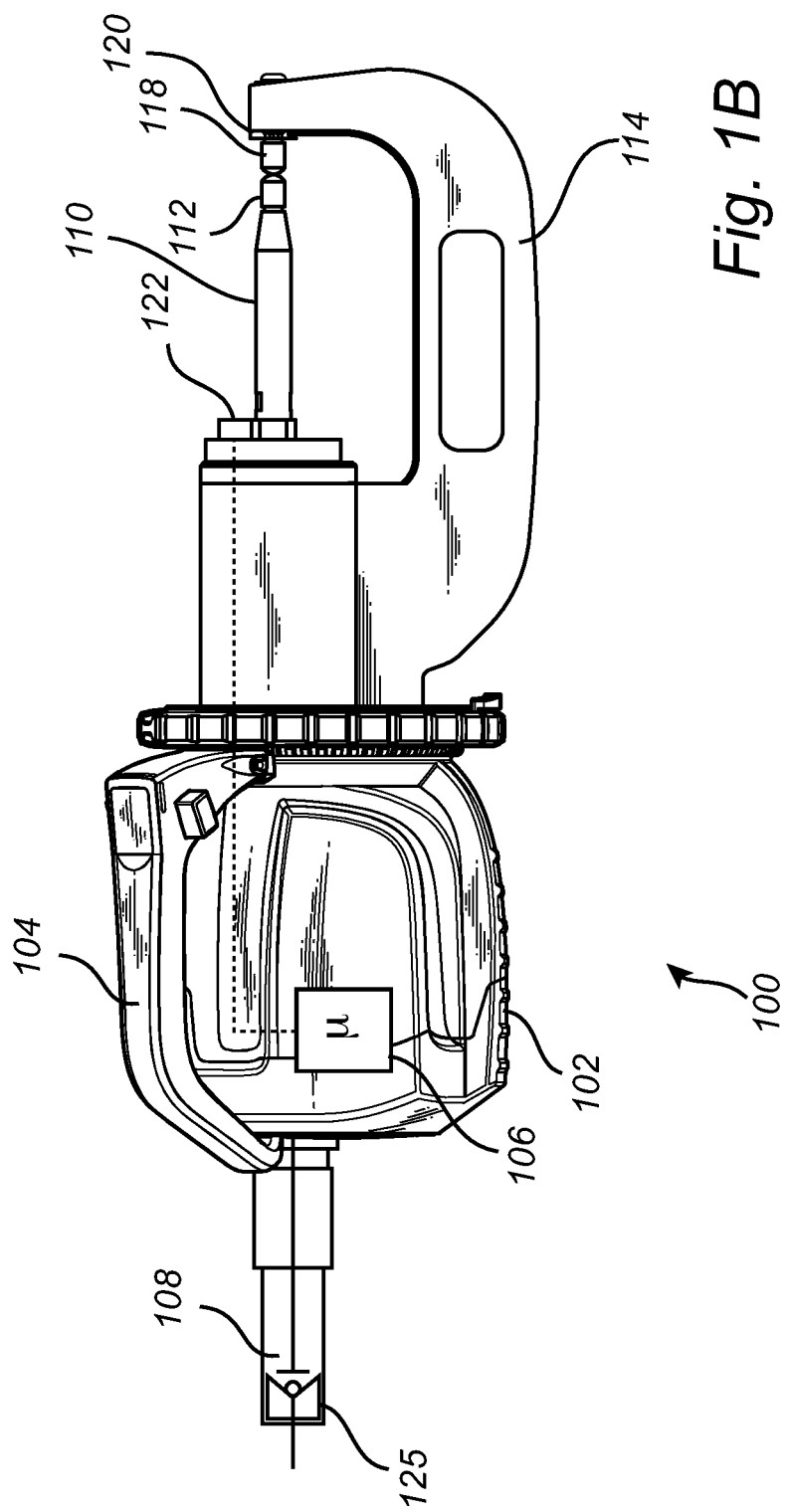

Turning now to the drawings and to FIGS. 1A and 1B in particular, there is in FIG. 1A shown a spot welding machine 10, for example handled by an operator/user 15 when repairing e.g. a vehicle 20. The spot welding machine comprises a power unit and a welding gun 100 as is further detailed in FIG. 1B. The welding gun 100 is connected to the power unit 50 using a hose package 60, e.g. providing electrical power and possibly compressed air (e.g. for possible pneumatic operations) for the welding gun 100. In the illustration provided in FIG. 1A, the welding gun 100 is suspended in a support arm 70 that is arranged with the power unit 50. In a possible non-limiting embodiment the power unit 50 may provide up to and possibly even more than 200 A to the welding gun 100. The welding gun may in turn deliver a welding current of up to 10.000 A or more for performing the welding operation.

With detailed reference to FIG. 1B, there is provided a conceptual illustration of the welding gun 100. The spot welding gun 100 comprises a housing portion 102 with a handle 104 for holding the spot welding gun 100 with one of the operator's hands. The housing portion 102 comprises electronics and mechanics for operating the spot welding arrangement 100 during the pre-processing scheme as for general spot welding. The electronics for example comprises a control unit 106.

The control unit arrangement 106 may include one or a plurality of microprocessors, microcontrollers, programmable digital signal processors or other programmable devices. The control unit arrangement 106 may also, or instead, include one or a plurality of application specific integrated circuits, programmable gate arrays or programmable array logic, programmable logic devices, or digital signal processors.

Where the control unit arrangement 106 includes programmable devices such as microprocessors, microcontrollers or programmable digital signal processors as mentioned above, the processors may further include computer executable code that controls operation of the programmable devices.

Moreover, an interface potion 108 of the welding hose is connected to the housing portion 102 for supply of electricity (and possibly compressed air) to the spot welding gun 100, by means of the hose package 60 connected to the power unit 50.

Furthermore, the spot welding gun 100 comprises a welding electrode 110 extending from the housing portion 102. The welding electrode 110 is movable in its axial direction which will be described further below. Still further, the spot welding gun 100 comprises a welding tip portion 112 arranged at an outer end portion of the movable electrode 110. The welding tip portion 112 is also commonly referred to as a welding cap, or cap electrode. The welding tip portion 112 is a wear part which is replaceable after extensive use.

Moreover, the spot welding gun 100 comprises a welding yoke 114. The welding yoke 114 is in the example embodiment arranged in a C-shaped configuration. The welding yoke 114 comprises a portion 118 arranged at an outer end part 120 of the welding yoke 114. The portion 118, i.e. a welding tip portion is also arranged as a welding cap and which is a replaceable wear part.

As is further depicted in FIG. 1A, the spot welding gun 100 also comprises a distance detector 122 arranged to detect the distance moved by the movable welding tip portion 112. The distance detector 122 is connected to the control unit 106 for transmitting control signals thereto. Further, the welding gun 100 may comprise a valve 125 arranged to control the supply of pneumatic pressure to the welding tip portion. Hereby, the valve 125, preferably a proportional valve, can control the supply of high pressurized air for setting a preset force value. The valve 125 may also be used in addition or in combination with a force detector.

During a "general spot welding process", a workpiece (i.e. a material(s) to be welded) are placed between the welding tip portion 112 and the portion 118 of the welding yoke 114. Due to the C-shaped configuration, the workpiece is given sufficient space for the welding operation. The movable welding tip portion 112 moves towards the welding yoke 114 when the workpiece is positioned between the welding tip portion 112 and the portion 118 of the welding yoke 114. Once a sufficient pressure is obtained between the welding tip portions, electrical current is supplied between the welding tip portions for achieving a spot weld in the workpiece.

In accordance with the present disclosure, with further reference to FIG. 2, there is provided a detailed illustration of a possible architecture of the welding gun 100. As is illustrated, the welding gun 100 comprises said control unit 106. The welding gun 100 further comprises a transformer 202 and a diode bridge 204. The hose package 60 and the interface portion 108 is arranged to be connected to the welding gun 100, for providing electrical power and compressed air to the welding gun 100 (as well as control signals between the power unit 50 and the welding gun 100). As such, the welding gun 100 comprises an electrical connector 206 and means 208 for providing the compressed air to the welding gun 100. The electrical connector 206 is arranged at a primary side of the transformer 202 for providing the electrical AC power from the power unit 50 to the welding gun 100. Correspondingly, the diode bridge 204 is arranged at a secondary side of the transformer 202 and provided for rectifying the voltage at the secondary side of the transformer 202, providing a pulsing DC voltage output.

Furthermore, the welding gun 100 also comprises measurement means arranged at a secondary output side of the transformer 202. The measurement means may for example comprise a current sensor 210, in a non-limiting example implemented as a current clamp provided at and around the welding electrode 110 (where the welding yoke 114 essentially forms a second electrode in the pair of electrodes of the welding gun 100). The current sensor 210 is arranged in communication with the control unit 106.

Additionally, a voltage sensor may be comprised (not explicitly shown) and arranged in communication with the control unit 106. The voltage sensor may for example be adapted to measure a voltage level of the pulsing DC voltage output, in comparison to a ground level provided as an output at the secondary side of the transformer 202.

Figure 3:
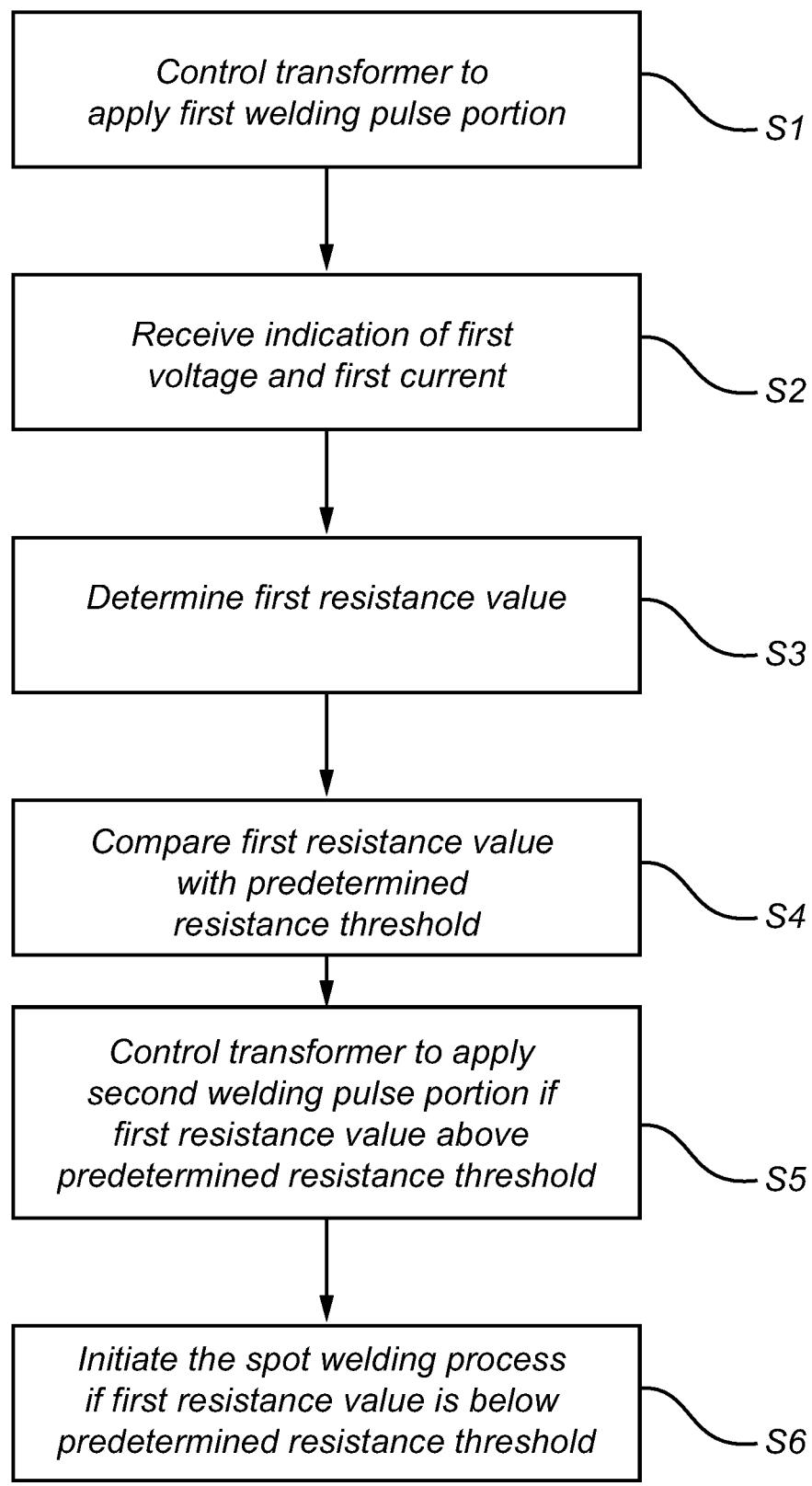
FIG. 3 is a flowchart disclosing the exemplary steps of the present disclosure.

With further reference to FIG. 3, the pre-conditioning scheme according to the present disclosure is performed by controlling, S1, using the control unit 106, the transformer 202 for applying, prior to performing the general spot welding process, a first welding pulse portion to the workpiece using the welding gun 100. The control unit 106 then receives, S2, from the current sensor 210 and the voltage sensor arranged at the secondary output side of the transformer 202, an indication of a first voltage and a first current applied in relation to the first welding pulse portion. The control unit 106 will then determine, S3, a first resistance value based on the indication of the first voltage and the first current. This first resistance value is subsequently compared, S4, by the control unit 106 with a predetermined resistance threshold, where this predetermined resistance value for example is set based on a thickness of the workpiece.

Additionally, the control unit 106 controls, S5, the transformer 202 to apply a further second welding pulse portion to the workpiece using the welding gun 100 if the first resistance value is above the predetermined resistance threshold. Alternatively, in case first resistance value is below the predetermined resistance threshold, the control unit 106 controls the welding machine 10 to initiate the general spot welding process.

It should be readily understood that the components arranged in connection to the welding arrangement are merely schematically depicted and must not necessarily be arranged on/in the specific welding yoke arrangement 100. For example, the control unit 106, the force detector and the valve 125 may form part of a unit giving supply of electrical current to the welding arrangement 100. In such a case, control signals are generated in the external unit, which unit thus forms part of the above described welding arrangement 100.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other features or steps, and the indefinite article "a" or "an" does not exclude a plurality.

The invention claimed is:

1. A welding machine adapted for performing a spot welding process on a workpiece, wherein the welding machine comprises:
a welding gun including a pair of opposed electrodes for receiving the workpiece, the pair of electrodes comprising at least one movable welding tip portion;
a transformer having a primary input side and secondary output side, the secondary output side connected to the pair of electrodes;
a distance detector arranged to detect the distance moved by the movable welding tip portion; and
a control unit adapted to control the spot welding process, wherein the control unit is further adapted to:
control the transformer for applying, prior to performing the spot welding process, a first welding pulse portion to the workpiece using the welding gun,
receive, from measurement means arranged at the secondary output side of the transformer, an indication of a first voltage and a first current applied in relation to the first welding pulse portion,
determine a first resistance value based on the indication of the first voltage and the first current,
compare the first resistance value with a predetermined resistance threshold, wherein the predetermined resistance threshold is based on a thickness of the workpiece determined using information received from the distance detector,
control the transformer for applying, prior to performing the spot welding process, a further second welding pulse portion to the workpiece using the welding gun if the first resistance value is above the predetermined resistance threshold, and
initiate the spot welding process if the first resistance value is below the predetermined resistance threshold.

2. The welding machine according to claim 1, wherein the first welding pulse portion has a setting and the second welding pulse portion has a setting.

3. The welding machine according to claim 2, wherein at least one of the first and the second setting is set based on a thickness of the workpiece received at the control unit.

4. The welding machine according to claim 1, wherein the thickness of the workpiece is at least partly determined by mechanically moving the electrodes towards the workpiece and comparing a movement distance to a reference value.

5. The welding machine according to claim 1, wherein the measurement means comprises a current sensor and a voltage sensor.

6. The welding machine according to claim 1, wherein the control unit is further adapted to, if the second welding pulse portion has been applied to the workpiece using the welding gun:
receive, from the measurement means arranged at the secondary output side of the transformer, an indication of a second voltage and a second current applied in relation to the first welding pulse portion,
determine a second resistance value based on the indication of the second voltage and the second current,
compare the second resistance value with the predetermined resistance threshold, and
control the transformer for applying, prior to performing the spot welding process, a further third welding pulse portion to the welding gun if the second resistance value is above the predetermined resistance threshold.

7. The welding machine according to claim 6, wherein the setting for the first welding pulse portion is different from the setting for the second welding pulse portion.

8. The welding machine according to claim 6, wherein the setting for second welding pulse portion is different from a setting for the third welding pulse portion.

9. The welding machine according to claim 7, wherein a current value for at least one of the first and second welding pulse portion is lower as compared to a corresponding current value applied during the spot welding process.

10. The welding machine according to claim 7, wherein a duration of at least one of the first and second welding pulse portion is shorter as compared to corresponding duration applied during the spot welding process.

11. The welding machine according to claim 1, wherein the welding machine is mobile.

12. The welding machine according to claim 1, wherein welding gun comprises a housing, and the transformer and the control unit are arranged within the housing of the welding gun.

13. A method of controlling a resistance at a workpiece prior to performing a spot welding process to the workpiece using a welding machine, the welding machine comprising:
a welding gun including a pair of opposed electrodes for receiving the workpiece, the pair of electrodes comprising at least one movable welding tip portion;
a transformer having a primary input side and secondary output side, the secondary output side connected to the pair of electrodes;
a distance detector arranged to detect the distance moved by the movable welding tip portion; and
a control unit adapted to control the spot welding process, wherein the method comprises the steps of:
controlling, using the control unit, the transformer for applying, prior to performing the spot welding process, a first welding pulse portion to the workpiece using the welding gun,
receiving, at the control unit from measurement means arranged at the secondary output side of the transformer, an indication of a first voltage and a first current applied in relation to the first welding pulse portion,
determining, at the control unit, a first resistance value based on the indication of the first voltage and the first current,
comparing, at the control unit, the first resistance value with a predetermined resistance threshold, wherein the predetermined resistance threshold is based on a thickness of the workpiece determined using information received from the distance detector,
controlling, using the control unit, the transformer for applying, prior to performing the spot welding process, a further second welding pulse portion to the workpiece using the welding gun if the first resistance value is above the predetermined resistance threshold, and
initiating, using the control unit, the spot welding process if the first resistance value is below the predetermined resistance threshold.

14. A computer program product comprising a non-transitory computer readable medium having stored thereon computer program means for controlling a welding machine adapted for performing a spot welding process on a workpiece, wherein the welding machine comprises:
- a welding gun including a pair of opposed electrodes for receiving the workpiece, the pair of electrodes comprising at least one movable welding tip portion;
- a transformer having a primary input side and secondary output side, the secondary output side connected to the pair of electrodes;
- a distance detector arranged to detect the distance moved by the movable welding tip portion; and
- a control unit adapted to control the spot welding process, wherein the computer program product comprises:
    - code for controlling, using the control unit, the transformer for applying, prior to performing the spot welding process, a first welding pulse portion to the workpiece using the welding gun,
    - code for receiving, at the control unit from measurement means arranged at the secondary output side of the transformer, an indication of a first voltage and a first current applied in relation to the first welding pulse portion,
    - code for determining, at the control unit, a first resistance value based on the indication of the first voltage and the first current,
    - code for comparing, at the control unit, the first resistance value with a predetermined resistance threshold, wherein the predetermined resistance threshold is based on a thickness of the workpiece determined using information received from the distance detector,
    - code for controlling, using the control unit, the transformer for applying, prior to performing the spot welding process, a further second welding pulse portion to the workpiece using the welding gun if the first resistance value is above the predetermined resistance threshold, and
    - code for initiating, using the control unit, the spot welding process if the first resistance value is below the predetermined resistance threshold.

\* \* \* \* \*